(12) United States Patent
Arai

(10) Patent No.: US 12,174,584 B2
(45) Date of Patent: Dec. 24, 2024

(54) ELECTROSTATIC CHARGE IMAGE DEVELOPING TONER

(71) Applicant: Konica Minolta, Inc., Tokyo (JP)

(72) Inventor: Keiji Arai, Higashimurayama (JP)

(73) Assignee: KONICA MINOLTA, INC., Tokyo (JP)

( * ) Notice: Subject to any disclaimer, the term of this patent is extended or adjusted under 35 U.S.C. 154(b) by 206 days.

(21) Appl. No.: 17/556,003

(22) Filed: Dec. 20, 2021

(65) Prior Publication Data

US 2022/0206403 A1 Jun. 30, 2022

(30) Foreign Application Priority Data

Dec. 28, 2020 (JP) ................................ 2020-218791

(51) Int. Cl.
*G03G 9/087* (2006.01)
*C01G 23/00* (2006.01)

(52) U.S. Cl.
CPC ....... *G03G 9/08753* (2013.01); *C01G 23/006* (2013.01)

(58) Field of Classification Search
CPC .................. G03G 9/08753; C01G 23/006
See application file for complete search history.

(56) References Cited

U.S. PATENT DOCUMENTS

| 5,931,996 A | * | 8/1999 | Reisser | C09D 5/36 106/404 |
| 2018/0267416 A1 | * | 9/2018 | Uchino | G03G 9/08797 |
| 2019/0278192 A1 | * | 9/2019 | Shibata | G03G 9/09708 |
| 2019/0294068 A1 | * | 9/2019 | Yamagishi | G03G 9/09708 |

FOREIGN PATENT DOCUMENTS

JP 2017062315 A 3/2017

\* cited by examiner

*Primary Examiner* — Peter L Vajda
*Assistant Examiner* — Boone Alexander Evans
(74) *Attorney, Agent, or Firm* — LUCAS & MERCANTI, LLP

(57) ABSTRACT

An electrostatic charge image developing toner includes: toner base particles containing a binder resin and a metal pigment; and an external additive containing lanthanum-containing strontium titanate particles.

5 Claims, No Drawings

ELECTROSTATIC CHARGE IMAGE DEVELOPING TONER

The entire disclosure of Japanese patent Application No. 2020-218791, filed on Dec. 28, 2020, is incorporated herein by reference in its entirety.

BACKGROUND

Technological Field

The present invention relates to an electrostatic charge image developing toner.

Description of the Related Art

In recent years, with spread of an electrophotographic image forming apparatus, applications thereof have been diversified. The image forming apparatus is sometimes required to output a high added value image as seen in a commercial printing field, and for example, also required to form an image having metallic gloss. An image having metallic gloss is usually formed using a photoluminescent toner.

The photoluminescent toner contains a metal pigment made of a metal powder such as aluminum, brass, bronze, nickel, stainless steel, or zinc in addition to a binder resin (for example, JP 2017-62315 A).

In such a photoluminescent toner containing a binder resin and a metal pigment as described above, the charging characteristics of the binder resin are largely different from those of the metal pigment. That is, the charging characteristics are largely different between a portion where the metal pigment is present and a portion where the metal pigment is not present. Therefore, the charging characteristics on a surface of the toner tend to be non-uniform. When the charging characteristics of a surface of the toner are non-uniform, a charge amount distribution of the toner is wide during continuous printing. There is a problem that the photoluminescent toner having a small charge amount easily falls off from a photosensitive layer or the like of an image forming apparatus and easily scatters in the atmosphere.

SUMMARY

The present invention has been achieved in view of the above problem. Specifically, an object of the present invention is to provide an electrostatic charge image developing toner containing a metal pigment and capable of suppressing occurrence of toner scattering even during continuous printing.

To achieve the abovementioned object, according to an aspect of the present invention, an electrostatic charge image developing toner reflecting one aspect of the present invention comprises: toner base particles containing a binder resin and a metal pigment; and an external additive containing lanthanum-containing strontium titanate particles.

DETAILED DESCRIPTION OF EMBODIMENTS

Hereinafter, one or more embodiments of the present invention will be described. However, the scope of the invention is not limited to the disclosed embodiments.

As described above, in the conventional photoluminescent toner containing a metal pigment, the charging characteristics of a surface of the photoluminescent toner tend to be non-uniform, and the photoluminescent toner easily scatters during continuous printing. When the photoluminescent toner scatters, there is a problem that not only the environment is affected, but also the photoluminescent toner is attached to a region other than a desired region, and it is difficult to obtain a high-quality image.

As a result of intensive studies by the present inventors on the problem, it has been revealed that an electrostatic charge image developing toner (hereinafter, also simply referred to as "toner") containing toner base particles containing a binder resin and a metal pigment and an external additive containing lanthanum-containing strontium titanate particles is less likely to scatter even during continuous printing. A reason for this is considered as follows.

A surface of the toner base particles containing a binder resin and a metal pigment has irregularities, and usually, a portion containing the metal pigment is a protrusion, and a portion not containing the metal pigment is a recess. Meanwhile, the lanthanum-containing strontium titanate particles each have a structure close to a spherical shape. When the lanthanum-containing strontium titanate particles are mixed with the base particles having irregularities, the lanthanum-containing strontium titanate particles enter recesses on a surface of the toner base particles. In addition, the lanthanum-containing strontium titanate particles have similar charging characteristics to the metal pigment. Therefore, when the lanthanum-containing strontium titanate particles enter recesses on a surface of the toner base particles, the charging characteristics of the surface of the toner become uniform.

In addition, the lanthanum-containing strontium titanate particles have a relatively large specific gravity. When the lanthanum-containing strontium titanate particles are mixed with the toner base particles, some of the lanthanum-containing strontium titanate particles enter the toner base particles and are relatively firmly immobilized. Therefore, even when continuous printing is performed or the lanthanum-containing strontium titanate particles receive a stress in a developing device, the lanthanum-containing strontium titanate particles are hardly moved or released on a surface of the toner base particles, and can sufficiently exhibit an effect thereof.

Here, the toner according to an embodiment of the present invention only needs to contain at least toner base particles and an external additive, but may contain other components as long as the object and effect of the present invention are not impaired. In addition, the toner according to an embodiment of the present invention may be a one-component developer or a two-component developer. When the toner is a two-component developer, the toner further contains carrier particles in addition to the toner base particles and the external additive (hereinafter, these are also collectively referred to as "toner particles"). Hereinafter, each component will be described in detail.

(1) Toner Base Particles

The toner base particles contain at least a binder resin and a metal pigment. The toner base particles may further contain a release agent or the like as necessary.

(Binder Resin)

The binder resin is a resin having a function of binding toner particles to a recording medium. The binder resin preferably contains an amorphous resin and a crystalline resin.

The content of the binder resin is preferably 50 to 95% by mass, and more preferably 70 to 90% by mass with respect to the total amount of the toner base particles. When the amount of the binder resin is within the above range, an image formed using the toner is easily fixed to a recording medium.

Amorphous Resin

The amorphous resin contained in the binder resin only needs to be a resin having substantially no crystallinity Here, the phrase "having substantially no crystallinity" means that a resin does not have a melting point when the resin is subjected to differential scanning calorimetry (DSC).

Examples of the amorphous resin include a vinyl resin, a urethane resin, a urea resin, and an amorphous polyester resin. Among these resins, a vinyl resin is preferable because of having a small variation due to an environmental difference. The binder resin may contain only one type or two or types of amorphous resins.

The vinyl resin is not particularly limited as long as the vinyl resin is obtained by polymerizing a vinyl compound, and examples thereof include a (meth)acrylate resin, a styrene-(meth)acrylate resin, and an ethylene-vinyl acetate resin. Among these resins, a styrene-(meth)acrylate resin is more preferable in consideration of plasticity at the time of thermal fixing. Here, (meth)acryl refers to methacryl, acryl, and a mixture thereof.

Hereinafter, the preferable styrene-(meth)acrylate resin (hereinafter, also referred to as "styrene-(meth)acrylic resin") will be described.

The styrene-(meth)acrylic resin is a resin obtained by addition polymerization of at least a styrene-based monomer and a (meth)acrylate monomer. The styrene-based monomer here includes, in addition to styrene represented by a structural formula of $CH_2=CH-C_6H_5$, a compound in which an arbitrary side chain or functional group is bonded to a styrene skeleton. In addition, the (meth)acrylate monomer here includes, in addition to an acrylate compound or a methacrylate compound represented by $CH_2=CHCOOR$ (R is an alkyl group), an ester compound to which an arbitrary side chain or functional group is bonded, such as an acrylate derivative or a methacrylate derivative.

Specific examples of the styrene-based monomer include styrene, o-methylstyrene, m-methylstyrene, p-methylstyrene, α-methylstyrene, p-phenylstyrene, p-ethylstyrene, 2,4-dimethylstyrene, p-tert-butylstyrene, p-n-hexylstyrene, p-n-octylstyrene, p-n-nonylstyrene, p-n-decylstyrene, and p-n-dodecylstyrene. The styrene-(meth)acrylic resin may contain only one type or two or more types of structures derived from these compounds.

Meanwhile, specific examples of the (meth)acrylate monomer include an acrylate monomer such as methyl acrylate, ethyl acrylate, isopropyl acrylate, n-butyl acrylate, t-butyl acrylate, isobutyl acrylate, n-octyl acrylate, 2-ethylhexyl acrylate, stearyl acrylate, lauryl acrylate, or phenyl acrylate; and a methacrylate monomer such as methyl methacrylate, ethyl methacrylate, n-butyl methacrylate, isopropyl methacrylate, isobutyl methacrylate, t-butyl methacrylate, n-octyl methacrylate, 2-ethylhexyl methacrylate, stearyl methacrylate, lauryl methacrylate, phenyl methacrylate, diethylaminoethyl methacrylate, or dimethylaminoethyl methacrylate. The styrene-(meth)acrylic resin may contain only one type or two or more types of structures derived from these compounds.

The content of a constituent unit derived from the styrene-based monomer in the styrene-(meth)acrylic resin is preferably 40 to 90% by mass. The content of a constituent unit derived from the (meth)acrylate monomer in the styrene-(meth)acrylic resin is preferably 10 to 60% by mass. Note that the styrene-(meth)acrylic resin may contain not only structures derived from the styrene-based monomer and the (meth)acrylate monomer but also a structure derived from another monomer.

Examples of the other monomer include: a compound having a carboxyl group, such as acrylic acid, methacrylic acid, maleic acid, itaconic acid, cinnamic acid, fumaric acid, a maleic acid monoalkyl ester, or an itaconic acid monoalkyl ester; and a compound having a hydroxyl group, such as 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, or 4-hydroxybutyl (meth)acrylate. The styrene-(meth)acrylic resin may contain only one type or two or more types of structures derived from these compounds.

However, the content of a constituent unit derived from the other monomer in the styrene-(meth)acrylic resin is preferably 0.5 to 20% by mass.

The styrene-(meth)acrylic resin preferably has a weight average molecular weight (Mw) of 10,000 to 100,000. When the weight average molecular weight of the styrene-(meth)acrylic resin is within the range, the strength of an obtained image is increased.

A method for manufacturing the styrene-(meth)acrylic resin is not particularly limited. It is only required to polymerize the styrene-based monomer, the (meth)acrylate monomer, and as necessary, another monomer using any polymerization initiator such as a general peroxide, persulfide, persulfate, or azo compound by a known polymerization method such as bulk polymerization, solution polymerization, emulsion polymerization, a mini-emulsion method, or a dispersion polymerization method. In addition, in order to adjust a molecular weight, a general chain transfer agent may be used. The chain transfer agent is not particularly limited, and examples thereof include an alkyl mercaptan such as n-octyl mercaptan, and a mercapto fatty acid ester.

Note that when the styrene-(meth)acrylic resin is manufactured, polymerization may be performed in a plurality of stages. For example, by performing polymerization in multiple stages while changing the types, ratios, and the like of the styrene-based monomer and the (meth)acrylate monomer, the physical properties of the amorphous resin can be adjusted to fall within a desired range.

The glass transition temperature (Tg) of the styrene-(meth)acrylic resin is not particularly limited, but is preferably 25 to 60° C. from a viewpoint of reliably obtaining fixability such as low-temperature fixability and heat resistance such as a heat-resistant storage property or blocking resistance.

In addition, in order to increase the mechanical strength of the toner base particles and suppress burying of the lanthanum-containing strontium titanate particles, the amorphous resin may contain an amorphous polyester resin together with the styrene-(meth)acrylic resin.

The amorphous polyester resin is a resin obtained by polycondensation of a polyvalent carboxylic acid or a derivative thereof and a polyhydric alcohol or a derivative thereof. In the polycondensation, a catalyst may be used as necessary.

Examples of the polyvalent carboxylic acid include: a divalent carboxylic acid such as oxalic acid, succinic acid, maleic acid, adipic acid, β-methyladipic acid, azelaic acid, sebacic acid, nonanedicarboxylic acid, decanedicarboxylic acid, undecanedicarboxylic acid, dodecanedicarboxylic acid, fumaric acid, citraconic acid, diglycolic acid, cyclohexane-3,5-diene-1,2-dicarboxylic acid, malic acid, citric acid, hexahydroterephthalic acid, malonic acid, pimelic acid, tartaric acid, mucic acid, phthalic acid, isophthalic acid, terephthalic acid, tetrachlorophthalic acid, chlorophthalic acid, nitrophthalic acid, p-carboxyphenyl acetic acid, p-phenylene diacetic acid, m-phenylene diglycolic acid, p-phenylene diglycolic acid, o-phenylene diglycolic acid, diphenyl acetic acid, diphenyl-p,p'-dicarboxylic acid, naphthalene-1,4-dicarboxylic acid, naphthalene-1,5-dicarboxylic acid, naphthalene-2,6-dicarboxylic acid, anthracene dicarboxylic acid, or dodecenyl succinic acid; a trivalent or higher valent carboxylic acid such as trimellitic acid, pyromellitic acid, naphthalene tricarboxylic acid, naphthalene tetracarboxylic acid, pyrene tricarboxylic acid, or pyrene tetracarboxylic acid; alkyl esters of these carboxylic acids; anhydrides of these carboxylic acids; and acid chlorides of these carboxylic acids. The amorphous polyester resin may contain only one type or two or more types of structures derived from these. Among the above carboxylic acids, an unsaturated aliphatic dicarboxylic acid such as fumaric acid, maleic acid, or mesaconic acid is preferable.

Meanwhile, examples of the polyhydric alcohol include: a dihydric alcohol such as ethylene glycol, propylene glycol, butanediol, diethylene glycol, hexanediol, cyclohexanediol, octanediol, decanediol, dodecanediol, an ethylene oxide adduct of bisphenol A, or a propylene oxide adduct of bisphenol A; a trihydric or higher hydric polyol such as glycerin, pentaerythritol, hexamethylolmelamine, hexaethylolmelamine, tetramethylolbenzoguanamine, or tetraethylolbenzoguanamine; ester compounds of these alcohols; and hydroxycarboxylic acids of these alcohols. The amorphous polyester resin may contain only one type or two or more types of structures derived from these.

Here, the total amount of the amorphous resin with respect to the total amount of the binder resin is preferably 5 to 30% by mass. When the amount of the amorphous polyester is 5% by mass or more, the strength of an obtained image is easily increased. Meanwhile, when the amount of the amorphous resin is 30% by mass or less, the amount of the crystalline resin tends to be relatively sufficient, and fixability at a low temperature tends to be favorable.

Crystalline Resin

When the binder resin contains the crystalline resin, the flexibility of the toner base particles is easily enhanced, and the lanthanum-containing strontium titanate particles are easily fixed to a periphery of the toner base particles. Note that "crystalline resin" here means a resin having a clear endothermic peak instead of a stepwise endothermic change in differential scanning calorimetry (DSC). The clear endothermic peak means a peak having an endothermic peak half-width of 15° C. or less when measurement is performed at a temperature rising rate of 10° C./min in DSC. Note that it can be said that the smaller the endothermic peak half-width, the higher the degree of crystallinity.

Here, the type of the crystalline resin is not particularly limited, but a crystalline polyester resin is particularly preferable. When the binder resin contains the crystalline polyester resin, the toner base particles are easily melted by heating, and favorable low-temperature fixability is obtained.

The crystalline polyester resin is, for example, a resin obtained by a polycondensation reaction between the following polyvalent carboxylic acid and the following polyhydric alcohol.

Examples of the polyvalent carboxylic acid include: a saturated aliphatic dicarboxylic acid such as oxalic acid, malonic acid, succinic acid, adipic acid, sebacic acid, azelaic acid, n-dodecylsuccinic acid, nonanedicarboxylic acid, decanedicarboxylic acid, undecanedicarboxylic acid, dodecanedicarboxylic acid, or tetradecanedicarboxylic acid; an alicyclic dicarboxylic acid such as cyclohexanedicarboxylic acid; an aromatic dicarboxylic acid such as phthalic acid, isophthalic acid, or terephthalic acid; a trivalent or higher valent polyvalent carboxylic acid such as trimellitic acid or pyromellitic acid; anhydrides of these carboxylic acids; and alkyl (having 1 to 3 carbon atoms) esters of these carboxylic acids. The crystalline polyester resin may contain only one type or two or more types of structures derived from these.

Examples of the polyhydric alcohol include: an aliphatic diol such as 1,2-propanediol, 1,3-propanediol, 1,4-butanediol, 1,5-pentanediol, 1,6-hexanediol, 1,7-heptanediol, 1,8-octanediol, 1,9-nonanediol, dodecanediol, neopentyl glycol, or 1,4-butenediol; and a trihydric or higher hydric polyalcohol such as glycerin, pentaerythritol, trimethylolpropane, or sorbitol. The crystalline polyester resin may contain only one type or two or more types of structures derived from these.

The total amount of the crystalline polyester resin in the binder resin is preferably 5 to 20% by mass with respect to the total amount of the binder resin. When the amount of the crystalline polyester resin is 5% by mass or more, low-temperature fixability is easily obtained. In addition, when the amount of the crystalline polyester resin is 20% by mass or less, the toner is easily prepared.

The melting point of the crystalline polyester resin here is preferably 60 to 90° C. The melting point of the crystalline polyester resin is measured as follows. First, 3.0 g of a sample is sealed in an aluminum pan, and the temperature is raised from 0° C. to 200° C. at a temperature rising rate of 10° C./min using a differential scanning calorimeter (for example, a diamond DSC manufactured by PerkinElmer, Inc.) (first temperature rising process). Subsequently, the temperature is lowered from 200° C. to 0° C. at a cooling rate of 10° C./min (cooling process). Then, the temperature is raised from 0° C. to 200° C. at a temperature rising rate of 10° C./min (second temperature rising process). Then, a DSC curve is prepared from these measurement results, and an endothermic peak top temperature derived from the crystalline polyester resin in the first temperature rising process is taken as the melting point (Tm). Note that an empty aluminum pan is used as a reference.

Hybrid Resin

The binder resin may further contain a resin (hybrid resin) having a vinyl-based segment and a polyester-based segment. In the hybrid resin, the vinyl based segment and the polyester-based segment are preferably bonded to each other via a structure derived from a bireactive monomer. When the binder resin contains the hybrid resin, dispersibility of the crystalline resin in the amorphous resin is further improved.

The vinyl-based segment in the hybrid resin is formed of a vinyl resin. Here, the vinyl resin is similar to that described for the above-described amorphous resin. Note that the amount of the vinyl-based segment in the hybrid resin is preferably 0.5 to 20% by mass with respect to the total segment amount.

Meanwhile, the polyester-based segment in the hybrid resin is preferably formed of a crystalline polyester resin obtained by polycondensation reaction of a polyvalent carboxylic acid and a polyhydric alcohol in the presence of a catalyst. The polyvalent carboxylic acid and the polyhydric alcohol are similar to those described in the above-described crystalline resin. Note that the amount of the polyester-based segment in the hybrid resin is preferably 0.5 to 20% by mass with respect to the total segment amount.

The bireactive monomer is a monomer capable of reacting with both the crystalline polyester resin and the vinyl resin.

The bireactive monomer preferably has, in a molecule thereof, a group selected from the group consisting of a hydroxy group, a carboxyl group, an epoxy group, a primary amino group, and a secondary amino group that react with the crystalline polyester resin (polyester-based segment), and an ethylenically unsaturated group that reacts with the vinyl resin (vinyl-based segment). As the bireactive monomer, a monomer having a hydroxy group or a carboxyl group and an ethylenically unsaturated group is more preferable, and a monomer having a carboxyl group and an ethylenically unsaturated group is still more preferable. That is, the bireactive monomer is preferably a vinyl-based carboxylic acid.

Specific examples of the bireactive monomer include acrylic acid, methacrylic acid, fumaric acid, maleic acid, and hydroxyalkyl (having 1 to 3 carbon atoms) esters thereof. The bireactive monomer is preferably acrylic acid, methacrylic acid, or fumaric acid from a viewpoint of reactivity.

The amount of a constituent unit derived from the bireactive monomer in the hybrid resin is preferably 1 to 10 parts by mass, and more preferably 4 to 8 parts by mass with respect to 100 parts by mass of the amount of the vinyl-based segment from a viewpoint of improving the low-temperature fixability, high-temperature offset resistance, and durability of the toner.

A method for preparing the hybrid resin is not particularly limited, and the hybrid resin can be prepared by a known method. Typical methods thereof include the following three methods.

(1) A method for polymerizing a polyester-based segment in advance, causing a bireactive monomer to react with the polyester-based segment, and further causing a monomer for forming a vinyl-based segment to react therewith.

(2) A method for polymerizing a vinyl-based segment in advance, causing a bireactive monomer to react with the vinyl-based segment, and further causing a polyvalent carboxylic acid and a polyhydric alcohol for forming a polyester-based segment to react therewith.

(3) A method for preparing a polyester-based segment and a vinyl-based segment, and causing a bireactive monomer to react with the polyester-based segment and the vinyl-based segment to bond the polyester-based segment and the vinyl-based segment to each other.

Any of the above methods may be used, but the method (2) is preferable. Specifically, a polyvalent carboxylic acid and a polyhydric alcohol for forming a polyester-based segment, a vinyl resin for forming a vinyl-based segment, and a bireactive monomer are mixed, and a polymerization initiator is added thereto to addition-polymerize the vinyl-based segment resin and the bireactive monomer. Thereafter, an esterification catalyst is added thereto to bond the polyester-based segment to the addition-polymerized product. This method is preferable.

The catalyst for synthesizing the polyester polymerization segment may be a known catalyst, and examples thereof include: a tin compound such as dibutyltin oxide or tin (II) 2-ethylhexanoate; and a titanium compound such as titanium diisopropylate bistriethanolaminate Examples of an esterification cocatalyst include gallic acid.

(Metal Pigment)

The metal pigment is not particularly limited as long as the metal pigment contains metal and can impart metallic gloss to an image. For example, the metal pigment may be a metal powder such as aluminum, brass, bronze, nickel, stainless steel, zinc, copper, silver, gold, or platinum, or may be a thin flaky glass powder deposited with metal. The metal pigment may contain only one type or two or more types thereof. Among these, aluminum is preferable from a viewpoint of easy availability and the like. A surface of the metal pigment may be coated with silica particles, an acrylic resin, a polyester resin, or the like.

The shape of the metal pigment is not particularly limited, and may be spherical, scaly, or flat.

The particle size of the metal pigment is preferably 100 to 1000 nm, and more preferably 150 to 500 nm in terms of volume-based median size. When the average particle size of the metal pigment is within such a range, an image having metallic gloss is easily obtained. Meanwhile, when the average particle size of the metal pigment is within the above range, the problem of the present invention also tends to occurs.

The content of the metal pigment is preferably 1 to 70% by mass, and more preferably 5 to 50% by mass with respect to the total amount of the toner base particles. When the amount of the metal pigment is within the above range, a high-quality image is easily obtained in an image formed using the toner.

(Release Agent)

The toner base particles may further contain a release agent. The release agent is a component that exudes from the toner particles at the time of development to enhance fixing releasability and the like.

Wax is usually used as the release agent. Specific examples of the release agent include a polyolefin wax such as a polyethylene wax or a polypropylene wax; a Fischer-Tropsch wax; a branched chain hydrocarbon wax such as a microcrystalline wax; a long chain hydrocarbon-based wax such as a paraffin wax or a sazol wax; a dialkyl ketone-based wax such as distearyl ketone, an ester-based wax such as a carnauba wax, a montan wax, behenyl behenate, trimethylolpropane tribehenate, pentaerythritol tetrabehenate, pentaerythritol diacetate dibehenate, glycerin tribehenate, 1,18-octadecanediol distearate, tristearyl trimellitate, or distearyl maleate; and an amide-based wax such as ethylenediamine behenylamide or trimellitic acid tristearylamide. The toner base particles may contain only one type or two or more types of these release agents.

The content of the release agent is preferably 2 to 30% by mass with respect to the total amount of the toner base particles. When the amount of the release agent is within the range, fixing releasability tends to be favorable.

(Others)

The toner base particles may further contain another component in addition to the binder resin, the metal pigment, and the release agent. Examples of the other component include a colorant other than the metal pigment and a charge control agent.

Examples of the colorant include carbon black, a magnetic material, a pigment, and a dye. The toner base particles may contain only one type or two or more types of colorants. The amount of the colorant is appropriately selected according to a desired color, the type of the colorant, and the like.

Meanwhile, the charge control agent is not particularly limited as long as the charge control agent can provide a positive or negative charge by frictional charging, and various known positive charge control agents and negative charge control agents can be used. Examples of the charge control agent include a nigrosine-based dye, a metal salt of naphthenic acid or a higher fatty acid, an alkoxylated amine, a quaternary ammonium salt compound, an azo based metal complex, and a salicylic acid metal salt or a metal complex thereof. The toner base particles may contain only one type or two or more types of charge control agents. The amount of the charge control agent is preferably 2 to 20 parts by mass, and more preferably 0.5 to 5 parts by mass with respect to 100 parts by mass of the total amount of the binder resin.

(Structure of Toner Base Particle)

The structure of the toner base particle may be a single layer structure or a multilayer structure such as a core-shell structure including a core and a shell layer coating a surface of the core. The shell layer does not have to coat the entire surface of the core, and the core particle may be partially exposed. A cross section of the core-shell structure can be confirmed by a known observation means such as a transmission electron microscope (TEM) or a scanning probe microscope (SPM). Note that the core-shell structure here also includes a triple or more structure.

When the toner base particle has a core-shell structure, characteristics such as a glass transition point, a melting point, and hardness can be made different between the core and the shell layer. Therefore, toner base particles having physical properties according to a purpose can be obtained. For example, on a surface of a core containing a binder resin, a metal pigment, a release agent, and the like and having a relatively low glass transition point, particles of a resin having a relatively high glass transition point are aggregated and fused to form a shell layer.

The toner base particles preferably have an average circularity of 0.920 to 0.100. When the circularity of the toner base particles is within the range, a contact point between the toner particles is small. As a result, external force responsiveness is improved, and fluidity is increased. As a result, a toner excellent in toner replenishability is obtained. Note that when the average circularity is within the range, transfer efficiency is also favorable. Note that the average circularity can be measured using a flow particle image analyzer (for example, FPIA-3000 manufactured by Sysmex Corporation) or the like.

Specifically, the toner base particles are wetted with a surfactant aqueous solution, and ultrasonic dispersion is performed for one minute. After the dispersion, measurement is performed at an appropriate concentration of the HPF detection number of 3,000 to 10,000 in a measurement condition HPF (high magnification imaging) mode using the flow particle image analyzer. The circularity is calculated by the following formula. Note that the average circularity is an arithmetic average value obtained by summing the circularity of each toner base particle and dividing the sum by the number of all the measured particles.

Circularity=(peripheral length of circle having the same projected area as particle image)/(peripheral length of particle projected image)

In addition, the volume average particle size of the toner base particles is preferably 4.5 to 8.0 μm in terms of volume-based median size (D50). The particle size is preferably smaller from a viewpoint of improving image quality. However, when the particle size is smaller, an adhesive force of the toner base particles tends to increase, and fluidity tends to decrease. On the other hand, when the volume average particle size of the toner base particles is within the above range, it is possible to achieve both the image quality of an output image and toner replenishability, and charging, development, transfer, cleaning, and the like can also be favorably performed. Note that the volume average particle size of the toner base particles is more preferably 5.0 to 6.2 μm. When the volume average particle size is within the range, dot reproducibility is also enhanced, and a higher quality image can be obtained.

The volume-based median size (D50) of the toner base particles can be measured and calculated using an apparatus in which a computer system for data processing (for example, software V 3.51 manufactured by Beckman Coulter, Inc.) is connected to a particle size distribution measuring apparatus (for example, multisizer 3 manufactured by Beckman Coulter, Inc.).

More specifically, 0.02 g of the toner base particles are blended with 20 ml of a surfactant aqueous solution, and then ultrasonic dispersion is performed for one minute to prepare a toner base particle dispersion. Examples of the surfactant aqueous solution include a solution obtained by diluting a neutral detergent containing a surfactant component 10 times with pure water. The toner base particle dispersion is added dropwise to an electrolytic solution ISOTON II (manufactured by Beckman Coulter, Inc.) until a measurement concentration reaches 5 to 10%, and measurement is performed with a measuring machine count set to 25,000. Here, the particle size distribution measuring apparatus has an aperture diameter of 100 μm. In the measurement, the number of frequencies is calculated by dividing a range of 2 to 60 μm into 256 parts, and the particle size of 50% from a larger volume-based cumulative fraction is taken as the volume-based median size (D50).

(Method for Preparing Toner Base Particles)

A method for preparing the above-described toner base particles is not particularly limited, but the toner base particles are preferably prepared by an emulsion aggregation method. According to the emulsion aggregation method, toner base particles having a sharp particle size distribution and a highly controlled particle size can be obtained.

When the toner base particles are prepared by the emulsion aggregation method, the toner base particles can be prepared by the following procedure. First, a metal pigment dispersion in which a metal pigment is dispersed in an aqueous medium is prepared. On the other hand, a binder resin dispersion in which binder resin fine particles are dispersed in an aqueous medium is also prepared. Then, the metal pigment dispersion and the binder resin dispersion are mixed, and the metal pigment and the binder resin fine particles are aggregated, associated, and fused to form toner base particles. Then, the toner base particles are separated by filtration and dried.

When the metal pigment and the binder resin fine particles are aggregated, an aggregating agent may be used. Examples of the aggregating agent include: a salt of a monovalent metal such as an alkali metal such as sodium, potassium, or lithium; a salt of a divalent metal such as calcium, magnesium, manganese, or copper; and a salt of a trivalent metal such as iron or aluminum. More specific examples thereof include sodium chloride, potassium chloride, lithium chloride, calcium chloride, magnesium chloride, zinc chloride, copper sulfate, magnesium sulfate, and manganese sulfate. These compounds may be used singly or in combination of two or more types thereof. Among these compounds, a salt of a divalent metal is particularly preferable. When the salt of a divalent metal is used, the metal pigment and the binder resin fine particles can be aggregated with a small amount of the salt of a divalent metal.

(2) External Additive

The external additive is a component that functions to control fluidity, charging characteristics, and the like of the toner particles. The external additive only needs to contain at least lanthanum-containing strontium titanate particles, but may further contain other particles.

(Lanthanum-Containing Strontium Titanate Particles)

Lanthanum-containing strontium titanate is a compound obtained by doping strontium titanate with a lanthanum element which has high reactivity and is hardly crystal-grown. The amount of lanthanum atoms in the lanthanum-containing strontium titanate particles is preferably 3 to 12% by mass, and more preferably 5 to 10% by mass. As the amount of lanthanum in the lanthanum-containing strontium titanate particles increases, the shapes of the lanthanum-containing strontium titanate particles easily approach a spherical shape, and the lanthanum-containing strontium titanate particles are easily immobilized in recesses on a surface of the toner base particles. However, when the doping amount of lanthanum is too large, the dielectric constant of the toner may increase, a loss dielectric constant may increase, and responsiveness to a developing electric field may decrease. On the other hand, when the amount of lanthanum is 12% by mass or less, developability is favorable even if continuous printing is performed at a high image density.

The amount of lanthanum in the lanthanum-containing strontium titanate particles can be measured using a scanning fluorescent X-ray analyzer (for example, ZSX Primus IV manufactured by Rigaku Corporation). As a specific measurement method, 2 g of a sample is filled in a tablet molding ring having a diameter of 20 mm, and pressurized to be pelletized. Thereafter, measurement is performed under the following conditions.

X-ray generator conditions: target Rh, tube voltage 50 kV
Spectral system conditions: slit S2, dispersive crystal LiF, detector SC On the other hand, a plurality of samples in which the ratios of lanthanum titanate and strontium titanate are changed is prepared, measurement is performed in a similar manner with the scanning fluorescent X-ray analyzer, and a calibration curve is created. When the calibration curve is created, the ratio of lanthanum is calculated from the following formula.

Ratio of lanthanum[% by mass]=lanthanum[% by mass]/(lanthanum[% by mass]+strontium[% by mass])

Then, the calibration curve is compared with the above-described measurement value to determine the amount of lanthanum.

The number average primary particle size of the lanthanum-containing strontium titanate particles is preferably 8 nm to 40 nm, and more preferably 10 nm to 30 nm. When the number average primary particle size of the lanthanum-containing strontium titanate particles is within the range, as described above, the lanthanum-containing strontium titanate particles easily enter the irregularities on a surface of the toner base particles, and are easily attached to the surface of the toner base particles.

The number average primary particle size of the lanthanum-containing strontium titanate particles can be specified by observation with a scanning electron microscope (hereinafter, also referred to as "SEM"). Specifically, an SEM photograph of the toner magnified 30,000 times is taken by SEM (for example, JEM-7401F manufactured by JEOL Ltd.). Then, the particle size (Feret's diameter) of the primary particles of the lanthanum-containing strontium titanate particles is measured by observing the SEM photograph. The particle size is measured by selecting a region in which the total number of particles is about 100 to 200 in the SEM image. Then, the particle sizes (Feret's diameters) of 100 particles are measured, and an average value thereof is taken as the number average primary particle size.

The lanthanum-containing strontium titanate particles may be surface-treated with a coupling agent. When the lanthanum-containing strontium titanate particles are surface-treated with the coupling agent, adhesiveness of the lanthanum-containing strontium titanate particles to the toner base particles and aggregability between the lanthanum-containing strontium titanate particles are adjusted. In addition, the lanthanum-containing strontium titanate particles treated with the coupling agent are easily immobilized in the recesses of the toner base particles.

The type of the coupling agent is not particularly limited, and examples thereof include: an alkylsilazane-based compound such as hexamethyldisilazane; an alkyl alkoxysilane-based compound such as dimethyldimethoxysilane, dimethyldiethoxysilane, trimethylmethoxysilane, methyltrimethoxysilane, or butyltrimethoxysilane; a chlorosilane-based compound such as dimethyldichlorosilane or trimethylchlorosilane; silicone oil; silicone varnish; and a coupling agent represented by the following general formula (1):

$$X-M(OR)_3 \tag{1}$$

wherein M represents titanium or silicon, preferably silicon, X represents an alkyl group having 4 to 12 carbon atoms, and Rs each independently represent a methyl group or an ethyl group.

The coupling agent can be used singly or in combination of two or more types thereof. Among the above compounds, a silane coupling agent or a titanium coupling agent represented by general formula (1) is particularly preferable. The silane coupling agent or the titanium coupling agent having the above structure has high hydrophobicity because of having an alkyl group in the structure. Therefore, water is hardly adsorbed by the toner particles (particularly, lanthanum-containing strontium titanate particles), and the electrical characteristics of the lanthanum-containing strontium titanate particles are hardly changed.

Specific examples of the silane coupling agent represented by the general formula (1) include isobutyltrimethoxysilane, hexyltrimethoxysilane, decyltrimethoxysilane, and octyltriethoxysilane.

A method for treating the lanthanum-containing strontium titanate particles with the coupling agent is not particularly limited, but examples thereof include a method for spraying the coupling agent onto a surface of the lanthanum-containing strontium titanate particles or mixing the vaporized coupling agent and the lanthanum-containing strontium titanate particles, and heat-treating the resulting product. At this time, water, an amine, or another catalyst may be used. The surface modification with the coupling agent is preferably performed under an inert gas atmosphere such as nitrogen.

In addition, a method for mixing the coupling agent, the lanthanum-containing strontium titanate particles, and a solvent, and heating and drying the mixed liquid. At this time, either one of the coupling agent and the lanthanum-containing strontium titanate particles may be dispersed in the solvent first, or all the components may be mixed at the same time.

Here, the amount of the lanthanum-containing strontium titanate particles treated with the coupling agent is preferably such an amount that the carbon content of the lanthanum-containing strontium titanate particles is 1.0 to 8.0% by mass, and more preferably 2.0 to 7.0%. The carbon content of the lanthanum-containing strontium titanate particles is a characteristic value correlated with a surface treatment amount. For example, when an alkylsilane coupling agent is used, the larger the surface treatment amount is, the higher the carbon content is. In addition, when the alkyl group of the alkylsilane coupling agent has a large number of carbon atoms, the carbon content is also increased. When the carbon content is within the above range, the lanthanum-containing strontium titanate particles have moderate hydrophobicity, the electrical characteristics of the lanthanum-containing strontium titanate particles are hardly changed, and the lanthanum-containing strontium titanate particles are easily attached to the toner base particles.

The carbon content of the lanthanum-containing strontium titanate particles can be specified by burning the lanthanum-containing strontium titanate particles under an oxygen stream, and measuring the absorbance of generated $CO$ and $CO_2$ with an infrared spectrophotometer (IR). Specifically, a ceramic crucible is placed in a balance section of a commercially available carbon analyzer (for example, IR-212 manufactured by LECO Co., Ltd.), and 1 g of a measurement sample (lanthanum-containing strontium titanate particles) is put into the crucible. Furthermore, one spatula of a combustion aid is added to the crucible. Then, combustion treatment is performed using oxygen as a combustion gas, and the amount of carbon in the lanthanum-containing strontium titanate particles is measured.

Here, the amount of the lanthanum-containing strontium titanate particles in the toner particles is preferably 0.05 to 2.0% by mass, and more preferably 0.1 to 1.0% by mass with respect to the amount of the toner base particles. When the amount of the lanthanum-containing strontium titanate particles is 0.05% by mass or more, the recesses of the toner base particles are easily filled with the lanthanum-containing strontium titanate particles, and the charging characteristics of the toner tend to be uniform. Meanwhile, when the amount of the lanthanum-containing strontium titanate particles is 2.0% by mass or less, the lanthanum-containing strontium titanate particles are hardly aggregated, and favorable charging characteristics are easily obtained.

(Other Particles)

In addition to the lanthanum-containing strontium titanate particles, the external additive may contain other particles in order to control fluidity, charging characteristics, and the like of the toner particles. Examples of the other particles include silica particles, titania particles, alumina particles, zirconia particles, zinc oxide particles, chromium oxide particles, cerium oxide particles, antimony oxide particles, tungsten oxide particles, tin oxide particles, tellurium oxide particles, manganese oxide particles, and boron oxide particles. The number average primary particle size of the other particles can be adjusted by, for example, classification or mixing of classified products.

The other particles may be hydrophobized with a known surface modifier. Examples of the surface modifier include a silane coupling agent, a titanate-based coupling agent, an aluminate-based coupling agent, a fatty acid, a fatty acid metal salt or an esterified product thereof, rosin acid, and silicone oil.

Note that the amount of the other particles is preferably 0.05 to 2.0% by mass, and more preferably 0.1 to 1.0% by mass with respect to the amount of the toner base particles.

(3) Physical Properties of Toner Particles

The sizes and shapes of the toner particles containing the toner base particles and the external additive are not particularly limited as long as the effect and object of the present invention are not impaired. Usually, the volume-based median size (D50) of the toner particles is preferably 4.5 μm or more and 8.0 μm or less, and the average circularity of the toner particles is preferably 0.920 or more and 1.000 or less. A method for measuring the volume-based median size (D50) of the toner particles and a method for measuring the average circularity of the toner particles are similar to the method for measuring the volume average particle size of the toner base particles and the method for measuring the average circularity of the toner base particles.

Here, in a toner containing the toner particles, the adhesion strength of the lanthanum-containing strontium titanate particles on a particle surface of the toner, determined by the following formula (A), is preferably within a range of 45 to 85%. The adhesion strength is more preferably 50% or more and 80% or less.

Adhesion strength of lanthanum-containing strontium titanate particles=(Sr atom abundance ratio of toner after ultrasonic treatment/Sr atom abundance ratio of toner before ultrasonic treatment)×100   formula (A)

In the above formula (A), the toner after ultrasonic treatment refers to a toner (toner particles) obtained by wetting 3 g of the toner (or toner particles) with 40 g of a 0.2% by mass polyoxyethyl phenyl ether aqueous solution in a 100 mL plastic cup, applying ultrasonic energy to the solution with an ultrasonic homogenizer at a current value of 60 μA for three minutes, then filtering the solution using a filter having an opening of 1 μm, washing the filtered product using 60 mL of pure water, and drying the washed product. Examples of the ultrasonic homogenizer include US-1200 manufactured by Nippon Seiki Co., Ltd. As described later, a two-component developer contains toner particles and carrier particles. In this case, the ultrasonic treatment may be performed in a toner state in which the carrier particles are present, or the carrier particles may be removed from the toner to form only the toner particles, and then the ultrasonic treatment may be performed. In addition, the toner before the ultrasonic treatment refers to a toner that has not been subject to the ultrasonic treatment.

The Sr atom abundance ratio in formula (A) refers to a value calculated based on the following formula (B) from the peak area of each atom obtained by measuring a surface of the toner particles by X-ray electron spectroscopy. Note that here, a peak area$_{element}$ represents the peak area of an element represented by a subscript.

Sr atom abundance ratio=(peak area$_{Sr}$/(peak area$_C$+peak area$_O$+peak area$_{Si}$+peak area$_{Ti}$+peak area$_{Sr}$))×100 atom %   formula (B)

A more specific method for specifying the Sr atom abundance ratio will be described below. First, the peak area (peak area$_{Sr}$) of a strontium element, the peak area (peak area$_c$) of a carbon element, the peak area (peak area$_c$) of an oxygen element, the peak area (peak area$_{Si}$) of a silicon element, and the peak area (peak area$_{Ti}$) of a titanium element present within 3 nm from an outermost surface of the toner particles are specified by an X-ray photoelectron spectrometer (for example, K-Alpha manufactured by Thermo Fisher Scientific Inc.) under the following measurement conditions. Each peak area is specified from each atomic peak area using a relative sensitivity factor. Then, from each obtained peak area, the Sr atom abundance ratio is determined based on the above formula (B).

(Measurement Conditions)

X-ray: Al monochrome radiation source

Acceleration: 12 kV, 6 mA

Resolution: 50 eV
Beam system: 400 μm
Pass energy: 50 eV
Step size: 0.1 eV

Here, when the adhesion strength of the above-described lanthanum-containing strontium titanate particles described above is specified, X-ray electron spectroscopic measurement is performed before and after the ultrasonic treatment, and the Sr atom abundance ratio is determined before and after the ultrasonic treatment. Then, a ratio between the Sr atom abundance ratio before the ultrasonic treatment and the Sr atom abundance ratio after the ultrasonic treatment is specified.

The ratio between the Sr atom abundance ratio before the ultrasonic treatment and the Sr atom abundance ratio after the ultrasonic treatment indicates the adhesion strength of the lanthanum-containing strontium titanate particles in the toner particles. That is, the ratio indicates how strong the lanthanum-containing strontium titanate particles are immobilized on the toner base particles. Here, when the adhesion strength is less than 45%, even if the lanthanum-containing strontium titanate particles are attached to the toner base particles, the lanthanum-containing strontium titanate particles hardly stay at one place, and cannot contribute to making the charging characteristics uniform in some cases. Meanwhile, when the adhesion strength is more than 85%, there is a possibility that many of the lanthanum-containing strontium titanate particles are buried in the toner base particles, and an effect of adding the lanthanum-containing strontium titanate particles (improving the fluidity of the toner particles, making the charging characteristics uniform, and the like) cannot be sufficiently obtained in some cases. On the other hand, when the adhesion strength is 45% or more and 85% or less, the lanthanum-containing strontium titanate particles are attached to the toner base particles with appropriate strength, and the fluidity of the toner particles tends to be favorable or the charging characteristics tend to be uniform.

(4) Method for Manufacturing Toner Particles

A method for manufacturing the toner particles is not particularly limited, and the toner particles can be manufactured by a known method. For example, it is only required to prepare toner base particles by the method for preparing toner base particles described above, and to attach an external additive to a surface of the toner base particles.

A method for attaching the external additive to a surface of the toner base particles only needs to be a method capable of sufficiently mixing the toner base particles and the external additive. For example, the toner base particles and the external additive may be mixed using a known mixing apparatus such as a Turbuler mixer, a Henschel mixer, a Nauta mixer, or a V-type mixer.

The obtained toner particles may be used as a toner (one-component developer) as they are, but are preferably used as a two-component developer by being mixed with carrier particles as follows.

(5) Two-Component Developer

The two-component developer can be prepared by mixing the above-described toner particles with carrier particles and the like.

The carrier particles contained in the two-component developer may be conventionally known magnetic particles. Examples of the carrier particles include particles containing a metal such as iron, ferrite, or magnetite, and particles containing an alloy formed of these metals and a metal such as aluminum or lead. The ferrite may be a ferrite containing a heavy metal such as copper, zinc, nickel, or manganese, or may be a light metal ferrite containing an alkali metal and/or an alkaline earth metal.

In addition, the carrier particle may be a coated carrier particle including a core particle made of a magnetic material and a coating layer coating a surface of the core particle. Furthermore, the carrier particle may be a resin dispersion type carrier particle in which fine powder of a magnetic material is dispersed in a resin. Among these particles, the coated carrier particle is particularly preferable.

Examples of the core particle of the coated carrier particle include a metal particle such as iron powder, ferrite, or magnetite, and a particle in which these metals are dispersed in a resin, and a magnetite particle or a ferrite particle is preferable. In addition, the core particle of the carrier particle also preferably contains strontium. When the core particle contains strontium, irregularities on a surface of the core particle become larger, and even when the core particle is coated with the coating layer, a part of the core particle is exposed on a surface. As a result, the resistance of the carrier particles is adjusted so as to fall within a desired range.

Examples of a resin constituting the coating layer of the coated carrier particle include: a polyolefin-based resin such as polyethylene, polypropylene, chlorinated polyethylene, or chlorosulfonated polyethylene; a polyvinyl-based or polyvinylidene-based resin such as polystyrene, a polyacrylate such as polymethyl methacrylate, polyacrylonitrile, polyvinyl acetate, polyvinyl alcohol, polyvinyl butyral, polyvinyl chloride, polyvinyl carbazole, polyvinyl ether, or polyvinyl ketone; a copolymer such as a vinyl chloride-vinyl acetate copolymer or a styrene-acrylic acid copolymer; a silicone resin having an organosiloxane bond or a modified resin thereof (for example, a resin modified by an alkyd resin, a polyester resin, an epoxy resin, or polyurethane); a fluorine resin such as polytetrachloroethylene, polyvinyl fluoride, polyvinylidene fluoride, or polychlorotrifluoro ethylene; polyamide; polyester; polyurethane; polycarbonate; an amino resin such as a urea-formaldehyde resin; and an epoxy resin.

Among these resins, a polyacrylate resin is preferable, a resin having a structure derived from an alicyclic (meth) acrylate compound is more preferable, and a copolymer of an alicyclic (meth)acrylate compound and methyl methacrylate is still more preferable. When the coating layer contains the resin, the hydrophobicity of the coating layer is increased, and the moisture adsorption amount of the carrier particles decreases particularly under high temperature and high humidity. Therefore, a decrease in the charge amount of the carrier particles under high temperature and high humidity is easily suppressed. In addition, since the structure derived from the alicyclic (meth)acrylate has a rigid cyclic skeleton, the strength of the coating layer is increased, and the durability of the carrier particles is improved.

The coated carrier particles can be prepared by a known method such as a wet coating method or a dry coating method.

Here, the resistance of the carrier particles is preferably $1.0 \times 10^9$ to $1.0 \times 10^{11}$ Ω·cm, and more preferably $1.0 \times 10^9$ to $5.0 \times 10^{10}$ Ω·cm. When the resistance of the carrier particles is within the above range, in the toner, a charged charge hardly leaks, and rising of charging in a developing device is favorable. Note that the resistance of the carrier particles indicates the initial resistance of the carrier particles, and indicates the resistance of the carrier particles alone. The resistance is dynamically measured under development conditions with a magnetic brush. Specifically, an aluminum electrode drum having the same size as a photosensitive drum is replaced with the photosensitive drum, the carrier particles are supplied onto a developing sleeve to form a magnetic brush, the magnetic brush is rubbed with the electrode drum, a voltage (500 V) is applied between the sleeve and the drum, and a current flowing therebetween is measured. Then, a resistance DVR of the carrier particles is calculated from the following formula.

$$DVR(\Omega CM)=(V/I) \times (N \times L/Dsd)$$

V: voltage (V) between developing sleeve and drum
I: measured current value (A)
N: developing nip width (cm)
L: developing sleeve length (cm)
DSD: distance (cm) between developing sleeve and drum
Note that here, conditions in the resistance DVR measurement of the carrier particles are V=500V, N=1 cm, L=6 cm, and Dsd=0.6 mm.

In addition, the average particle size of the carrier particles is preferably 10 μm or more and 100 μm or less, and more preferably 20 μm or more and 80 μm or less in terms of volume-based median size. The volume-based median size of the carrier particles can be measured, for example, with a laser diffraction type particle size distribution measuring apparatus (HELOS; SYMPATEC) equipped with a wet type disperser.

Note that the carrier particles only need to be mixed with the above-described toner particles in an appropriate amount. Examples of a mixing device used for the mixing include a Nauta mixer, a W cone, and a V-type mixer.

The ratio (toner concentration) of the toner particles with respect to the total of the carrier particles and the toner particles in the two-component developer is preferably 4.0 to 8.0% by mass. When the ratio of the toner particles is 4.0 to 8.0% by mass, the toner charge amount is appropriate, and an image quality at the initial stage and after continuous printing is favorable.

EXAMPLES

Hereinafter, specific Examples of the present invention will be described together with Comparative Examples, but the present invention is not limited thereto. Note that in Examples, "parts" and "%" mean "parts by mass" and "% by mass", respectively, unless otherwise specified.

A. Preparation of Toner Base Particles

A-1. Preparation of Metal Pigment Dispersion

The following materials were prepared.
Aluminum pigment (2173EA manufactured by Showa Aluminum Powder Co., Ltd.): 100 parts by mass
Anionic surfactant (NEOGEN R manufactured by DKS Co., Ltd.): 1.5 parts by mass
Deionized water: 900 parts by mass
Then, a solvent was removed from a paste of aluminum pigment. Thereafter, all the materials were mixed and dispersed for one hour using an emulsifying and dispersing machine Cavitron (CR1010 manufactured by Pacific Machinery & Engineering Co., Ltd.). As a result, a metal pigment dispersion (solid content: 10% by mass) in which the metal pigment (aluminum pigment) was dispersed was obtained.

A-2. Preparation of Amorphous Resin Particle Dispersion (1) First Stage Polymerization
A monomer mixed liquid 1 containing the following materials was prepared.
Styrene: 584 parts by mass
n-Butyl acrylate: 160 parts by mass
Methacrylic acid: 56 parts by mass
Meanwhile, into a reaction container equipped with a stirrer, a temperature sensor, a cooling tube, and a nitrogen introducing device, 4 parts by mass of sodium polyoxyethylene (2) dodecyl ether sulfate and 3000 parts by mass of deionized water were put. Then, the internal temperature was raised to 80° C. while the mixture was stirred at a stirring speed of 230 rpm under a nitrogen stream. After the temperature was raised, a solution in which 10 parts by mass of potassium persulfate was dissolved in 200 parts by mass of deionized water was added thereto, and the liquid temperature was adjusted to 75° C. Then, the monomer mixed liquid 1 was added dropwise thereto over one hour. After the dropwise addition, polymerization was performed at 75° C. for two hours while the mixture was stirred to obtain a resin fine particle dispersion a.

(2) Second Stage Polymerization
A monomer mixed liquid 2 containing the following materials was prepared.
Styrene: 239 parts by mass
n-Butyl acrylate: 111 parts by mass
Methacrylic acid: 26 parts by mass
n-Octyl mercaptan: 3 parts by mass
Meanwhile, into a reaction container equipped with a stirrer, a temperature sensor, a cooling tube, and a nitrogen introducing device, a solution in which 2 parts by mass of sodium polyoxyethylene (2) dodecyl ether sulfate was dissolved in 3000 parts by mass of deionized water was put, and the solution was heated to 80° C. Separately, a solution was prepared by dissolving or dispersing 42 parts by mass (in terms of solid content) of the above resin fine particle dispersion a and 70 parts by mass of microcrystalline wax HNP-0190 (manufactured by Nippon Seiro Co., Ltd.) in the monomer mixed liquid 2 at 80° C. Then, the solution was added to the reaction container, and mixed and dispersed for one hour with a mechanical disperser CLEARMIX (manufactured by M Technique Co., Ltd.) having a circulation path to obtain a dispersion containing emulsified particles (oil droplets).

Furthermore, an initiator solution in which 5 parts by mass of potassium persulfate was dissolved in 100 parts by mass of deionized water was added to the dispersion, and polymerization was performed at 80° C. for one hour while the mixture was stirred to obtain a resin fine particle dispersion b.

(3) Third STAGE Polymerization
A monomer mixed liquid 3 containing the following materials was prepared.
Styrene: 380 parts by mass
n-Butyl acrylate: 132 parts by mass
Methacrylic acid: 39 parts by mass
n-Octyl mercaptan: 6 parts by mass
To the above-described resin fine particle dispersion b, a solution in which 10 parts by mass of potassium persulfate was dissolved in 200 parts by mass of deionized water was added. To the solution, the monomer mixed liquid 3 was added dropwise over one hour under a temperature condition of 80° C. After the dropwise addition was ended, polymerization was performed by heating and stirring the mixture for two hours. Thereafter, the mixture was cooled to 28° C. to obtain an amorphous resin particle dispersion.

A-3. Preparation of Crystalline Resin Particle Dispersion (1) Preparation of Crystalline Resin Into a reaction container equipped with a nitrogen introducing tube, a dehydration tube, a stirrer, and a thermocouple, 220 parts by mass of sebacic acid (molecular weight: 202.25) and 298 parts by mass of 1,12-dodecanediol (molecular weight: 202.33) were put, and heated to 160° C. to be dissolved. Thereafter, 2.5 parts by mass of tin (II) 2-ethylhexanoate and 0.2 parts by mass of gallic acid were added thereto, the temperature was raised to 210° C., and a reaction was performed for eight hours. Furthermore, the reaction was performed at 8.3 kPa for one hour to obtain a crystalline resin.

For the obtained crystalline resin, a DSC curve was obtained using a differential scanning calorimeter Diamond DSC (manufactured by PerkinElmer Co., Ltd.) at a temperature rising rate of 10° C./min. A measurement result of the melting point (Tm) by a method for measuring an endothermic peak top temperature was 82.8° C. In addition, the molecular weight was measured by gel permeation chromatography HLC-8120GPC (manufactured by Tosoh Corporation), and as a result, the weight average molecular weight in terms of standard styrene was 28,000.

(2) Preparation of Crystalline Resin Particle Dispersion 100 parts by mass of the crystalline resin was dissolved in 400 parts by mass of ethyl acetate. Subsequently, 25 parts by mass of a 5.0% by mass sodium hydroxide aqueous solution was added thereto to prepare a resin solution. This resin solution was put into a container having a stirrer, and 638 parts by mass of a 0.26% by mass sodium lauryl sulfate aqueous solution was added dropwise thereto and mixed therewith over 30 minutes while the resin solution was stirred. During the dropwise addition of the lauryl sulfate aqueous solution, when the liquid in the reaction container became cloudy and the entire amount of the lauryl sulfate aqueous solution was added dropwise, an emulsion in which the crystalline resin particles were uniformly dispersed was prepared.

Subsequently, the emulsion was heated to 40° C., and ethyl acetate was removed by distillation under a reduced pressure of 150 hPa using a diaphragm type vacuum pump V-700 (manufactured by BUCHI) to obtain a crystalline resin particle dispersion in which a crystalline polyester resin was dispersed.

A-4. Preparation of Toner Base Particles (1) Aggregation and Fusion Step

Into a reaction container equipped with a stirrer, a temperature sensor, a cooling tube, and a nitrogen introducing device, 300 parts by mass (in terms of solid content) of the amorphous resin particle dispersion, 60 parts by mass (in terms of solid content) of the crystalline resin particle dispersion, 1100 parts by mass of deionized water, and 40 parts by mass (in terms of solid content) of the metal pigment dispersion were put, and the liquid temperature was adjusted to 30° C. Thereafter, a 5 N sodium hydroxide aqueous solution was added thereto to adjust the pH to 10. Subsequently, an aqueous solution in which 60 parts by mass of magnesium chloride was dissolved in 60 parts by mass of deionized water was added thereto under stirring at 30° C. over 10 minutes. The temperature was maintained for three minutes, and then started to be raised. This system was heated to 85° C. over 60 minutes. While the temperature was maintained at 85° C., a particle growth reaction was continued. The particle sizes of aggregated particles were measured with Coulter Multisizer 3 (manufactured by Beckman Coulter, Inc.). When the volume-based median size reached 6.2 μm, an aqueous solution in which 40 parts by mass of sodium chloride was dissolved in 160 parts by mass of deionized water was added to stop particle growth. Furthermore, fusion between particles was advanced by heating and stirring the solution at a liquid temperature of 80° C. for one hour as an aging step, thereby preparing a dispersion of toner base particles having a circularity of 0.97.

(2) Washing and Drying Step

The generated dispersion of toner base particles was solid-liquid separated using a basket type centrifuge "MARK III model number 60×40+M" (manufactured by Matsumoto Machine Sales Co., Ltd.) to form a wet cake of the toner base particles. This wet cake was washed with deionized water at 40° C. until the electric conductivity of a filtrate reached 5 μS/cm using the basket type centrifuge, then transferred to a flash jet dryer (manufactured by Seishin Enterprise Co., Ltd.), and dried until the water content reached 0.5% by mass to obtain toner base particles.

B. Preparation of LANTHANUM-containing Strontium Titanate Particles

B-1. Preparation of Surface-Treated Lanthanum-Containing Strontium Titanate Particles 1

(1) Preparation of Lanthanum-Containing Strontium Titanate Particles 1

Metatitanic acid obtained by a sulfuric acid method was subjected to a deiron-bleaching treatment. Thereafter, a sodium hydroxide aqueous solution was added thereto to adjust the pH to 9.0, and a desulfurization treatment was performed. Thereafter, the mixture was neutralized with hydrochloric acid so as to have a pH of 5.8, and filtered and washed with water. Water was added to the washed cake to form a slurry having a $TiO_2$ amount of 1.85 mol/L. Thereafter, hydrochloric acid was added thereto to adjust the pH to 1.0, and a defibration treatment was performed. After the treatment, 0.625 molar metatitanic acid in terms of $TiO_2$ amount was collected and put into a 3 L reaction container. Furthermore, a strontium chloride aqueous solution and a lanthanum chloride and barium chloride aqueous solution were added thereto in a total amount of 0.719 mol such that a molar ratio of $SrO/LaO/TiO_2$ was 1.00/0.08/1.00. Thereafter, the $TiO_2$ concentration was adjusted to 0.313 mol/L. Next, the mixture was heated to 90° C. while the mixture was stirred and mixed. Then, 296 mL of a 5 N sodium hydroxide aqueous solution was added thereto over 12 hours. Thereafter, stirring was continued at 95° C. for one hour, and the reaction was ended.

The reaction slurry was cooled to 50° C., hydrochloric acid was added until the pH reached 5.0, and stirring was continued for one hour. The obtained precipitate was subjected to decantation washing, and hydrochloric acid was added to the slurry containing the precipitate to adjust the pH to 6.5. Then, isobutyltrimethoxysilane having a concentration of 9% by mass with respect to the solid content was added thereto, and the mixture was stirred for one hour. Subsequently, filtration and washing were performed, and an obtained cake was dried in the atmosphere at 120° C. for eight hours to obtain lanthanum-containing strontium titanate particles 1. The obtained particles were observed with a transmission electron microscope, and the number average primary particle size thereof was calculated on a weight basis and found to be 20 nm.

(2) Surface Treatment

The lanthanum-containing strontium titanate particles 1 obtained above were put into a reaction container. Under a nitrogen atmosphere, 20 g of a hydrophobic treatment agent isobutyltrimethoxysilane diluted with 60 g of hexane was added to 100 g of the powder while the powder was stirred with a rotary blade. The mixture was heated to 200° C., stirred for 120 minutes, and then cooled with cooling water to obtain surface-treated lanthanum-containing strontium titanate particles 1. Note that a carbon content was measured by a method described later.

B-2. Preparation of Surface-Treated Lanthanum-Containing Strontium Titanate Particles 2 to 4 and 15

Lanthanum-containing strontium titanate particles 2 to 4 and 15 were prepared in a similar manner to the lanthanum-containing strontium titanate particles 1 except that the addition time of sodium hydroxide at the time of preparing the lanthanum-containing strontium titanate particles 1 was changed. As a result, as indicated in Table 1, the particle sizes and the surface treatment amount (carbon content) of the lanthanum-containing strontium titanate particles were changed.

B-3. Preparation of Surface-Treated Lanthanum-Containing Strontium Titanate Particles 5 to 7

Lanthanum-containing strontium titanate particles 5 to 7 were prepared in a similar manner to the lanthanum-containing strontium titanate particles 1 except that the SrO/LaO/TiO$_2$ molar ratio at the time of preparing the lanthanum-containing strontium titanate particles 1 was changed. As a result, as indicated in Table 1, the lanthanum content ratio of the lanthanum-containing strontium titanate particles was changed.

B-4. Preparation of Surface-Treated Lanthanum-Containing Strontium Titanate Particles 8 to 12 and 14

Lanthanum-containing strontium titanate particles 8 to 12 and 14 were prepared in a similar manner to the above except that the silane coupling agent in surface-treating the lanthanum-containing strontium titanate particles 1 was changed to octyltriethoxysilane (C8), decyltrimethoxysilane (C10), hexamethyldisilazane (HMDS), polydimethylsiloxane (PMDS), none, or pentyltrimethoxysilane (C5) as indicated in Table 1. As a result, the surface treatment amount (carbon content) of the lanthanum-containing strontium titanate particles was changed.

B-5. Preparation of Surface-Treated Lanthanum-Containing Strontium Titanate Particles 13

Lanthanum-containing strontium titanate particles 13 were prepared in a similar manner to the above except that the stirring time in surface-treating the lanthanum-containing strontium titanate particles 1 was changed. As a result, the surface treatment amount (carbon content) of the lanthanum-containing strontium titanate particles was changed.

B-6. Preparation of Surface-Treated Lanthanum-Free Strontium Titanate Particles 16

Surface-treated lanthanum-free strontium titanate particles 16 were prepared in a similar manner to the lanthanum-containing strontium titanate particles 1 except that lanthanum chloride was not added in the preparation of the lanthanum-containing strontium titanate particles 1.

B-7. Method for Measuring Carbon Content in Lanthanum-Containing Strontium Titanate Particles Lanthanum-containing strontium titanate particles were burned under an oxygen stream, and the absorbance of generated CO and $CO_2$ was measured with an infrared spectrophotometer (IR). Specifically, a ceramic crucible was placed in a balance section of a commercially available carbon analyzer (for example, IR-212 manufactured by LECO Co., Ltd.), and 1 g of a measurement sample was weighed into the crucible. After the measurement sample was weighed, one spatula of a combustion aid was added to the crucible. Then, the crucible containing the measurement sample and the combustion aid was placed on a ceramic table of the apparatus, combustion treatment was performed using oxygen as a combustion gas, and the amount of carbon was measured.

C. Preparation of Toner Particles

C-1. Preparation of Toner Particles 1 (Example 1)

100 parts by mass of the above-described toner base particles, 1.0 part by mass of silica particles 1 (HMDS treatment, number average primary particle size=20 nm), 0.4 parts by mass of silica particles 2 (HMDS treatment, number average primary particle size=8 nm), and 0.5 parts by mass of the lanthanum-containing strontium titanate particles 1 were mixed and put into a Henschel mixer type FM20C/I (manufactured by NIPPON COKE & ENGINEERING CO., LTD.). Then, a rotation speed was set such that a peripheral speed of a tip of a blade was 50 m/s, and the mixture was stirred for 20 minutes to prepare toner particles 1 containing the toner base particles and the lanthanum-containing strontium titanate particles 1. Temperature at the time of mixing the lanthanum-containing strontium titanate particles was set to 40° C.±1° C., and when the temperature reached 41° C., cooling water was caused to flow into an outer bath of the Henschel mixer at a flow rate of 5 L/min. Meanwhile, when the temperature reached 39° C., cooling water was caused to flow at a flow rate of 1 L/min, and the temperature inside the Henschel mixer was controlled. The adhesion strength of the lanthanum-containing strontium titanate particles in the obtained toner particles was measured by a method described later.

C-2. Preparation of Toner Particles 2 to 25 (Examples 2 to 25 and Comparative Examples 1 and 2)

Toner particles 2 to 25 were prepared in a similar manner to the toner particles 1 except that the type or amount of the lanthanum-containing strontium titanate particles was changed as indicated in Table 1.

C-3. Adhesion Strength of Lanthanum-Containing Strontium Titanate Particles (Specification of Strontium Surface Ratio (Atom %) of Toner (Toner Particles) Before Ultrasonic Treatment)

For each of the toner particles 2 to 25, the peak area (peak area$_{Sr}$) of a strontium element, the peak area (peak area$_C$) of a carbon element, the peak area (peak area$_O$) of an oxygen element, the peak area (peak area$_{Si}$) of a silicon element, and the peak area (peak area$_{Ti}$) of a titanium element present within 3 nm from an outermost surface of the toner particles were specified by an X-ray photoelectron spectrometer (for example, K-Alpha manufactured by Thermo Fisher Scientific Inc.) under the following measurement conditions. The peak area of each element was specified from each atomic peak area using a relative sensitivity factor.

(Measurement Conditions)

X-ray: Al monochrome radiation source
Acceleration: 12 kV, 6 mA
Resolution: 50 eV
Beam system: 400 μm
Pass energy: 50 eV
Step size: 0.1 eV From the obtained element concentration, the Sr atom abundance ratio of the toner particles before the ultrasonic treatment was determined based on the following formula (B).

Sr atom abundance ratio=(peak area$_{Sr}$/(peak area$_C$+peak area$_O$+peak area$_{Si}$+peak area$_{Ti}$+peak area$_{Sr}$))×100 atom %    formula (B)

(Specification of Strontium Surface Ratio (Atom %) of Toner (Toner Particles) after Ultrasonic Treatment)

Subsequently, the following ultrasonic treatment was performed. First, 3 g of toner particles were put into a 100 ml plastic cup and wetted with 40 g of a 0.2% by mass polyoxyethyl phenyl ether aqueous solution. Then, using an ultrasonic homogenizer (US-1200 manufactured by Nippon Seiki Co., Ltd.), ultrasonic energy was adjusted such that a value of an ammeter attached to a main apparatus was 60 μA, and an ultrasonic treatment was performed for three minutes. Thereafter, the solution was filtered using a filter having an opening of 1 μm, the filtered product was washed using 60 ml of pure water, and the washed product was dried.

Thereafter, in a similar manner to the above, X-ray electron spectrometry was performed to determine the strontium surface ratio of the toner particles after the ultrasonic treatment. Then, the adhesion strength of the lanthanum-containing strontium titanate particles was determined based on the following formula (A).

adhesion strength of lanthanum-containing strontium titanate particles=(Sr atom abundance ratio of toner particles after ultrasonic treatment/Sr atom abundance ratio of toner particles before ultrasonic treatment)×100    formula (A)

The obtained values are indicated in Table 1. Note that a sample in which the value is 45% or more and 85% or less is acceptable.

C-5. Preparation of Colored Toner (Toner Particles 26) (Reference Example)

Toner particles 26 were prepared in a similar manner to the above-described toner particles 1 except that the following colorant particle dispersion was used instead of the metal pigment dispersion when the toner base particles were prepared.

(Preparation of Colorant Particle Dispersion)

90 parts by mass of sodium dodecyl sulfate was stirred and dissolved in 1,600 parts by mass of deionized water. While this solution was stirred, 420 parts by mass of colorant particles (carbon black Regal 330R manufactured by Cabot Corporation) were gradually added thereto. Subsequently, the resulting solution was dispersed using a stirrer CLEARMIX (manufactured by M Technique Co., Ltd.) to prepare a colorant particle dispersion. The particle size of each of the colorant particles in the dispersion was measured using a particle size distribution measuring device "Nanotrac Wave (manufactured by MicrotracBEL Corporation)", and found to be 117 nm.

D. Preparation of Two-Component Developer

D-1. Preparation of Carrier Particles (1) Preparation of Carrier Core Particles MnO, MgO, Fe$_2$O$_3$, and SrO were weighed at a ratio of MnO:MgO:Fe$_2$O$_3$:SrO=35 mol %:14.5 mol %:50 mol %:0.5 mol %. The mixture was mixed with water and pulverized with a wet media mill for five hours to obtain a slurry. The slurry thus obtained was dried with a spray drier to obtain spherical particles. The particle sizes of the particles were adjusted. Thereafter, the particles were heated at 950° C. for two hours to be subjected to temporary firing. The particles were pulverized for one hour with a wet ball mill using stainless steel beads each having a diameter of 0.3 cm. Thereafter, the particles were further pulverized for four hours using zirconia beads each having a diameter of 0.5 cm.

Polyvinyl alcohol (PVA) as a binder was added thereto at a concentration of 0.8% by mass with respect to the solid content. Subsequently, pulverization and drying were performed with a spray drier, and the resulting product was held at a temperature of 1350° C. for five hours in an electric furnace to be subjected to main firing. Thereafter, the resulting product was crushed and further classified to adjust the particle size. A low magnetic force product was separated by magnetic ore dressing to obtain carrier core particles. The carrier core particles each had a particle size of 35 μm.

(2) Preparation of Coating Layer Material

Cyclohexyl methacrylate and methyl methacrylate were added at a mass ratio (copolymerization ratio) of 5:5 to a 0.3% by mass sodium benzenesulfonate aqueous solution, and potassium persulfate in an amount corresponding to 0.5% by mass of the total amount of monomers was added thereto to perform emulsion polymerization. The polymer was dried by spray drying to prepare a coating layer material. The coating layer material thus obtained had a weight average molecular weight of 500,000.

(3) Preparation of Carrier Particles

Into a high-speed stirring mixer with a horizontal stirring blade, 100 parts by mass of the carrier core particles and 4.5 parts by mass of the coating layer material were put, and the mixture was mixed and stirred at 22° C. for 15 minutes under a condition that a peripheral speed of a horizontal rotary blade was 8 msec. Thereafter, the mixture was mixed at 120° C. for 50 minutes to form a coating layer on a surface of the core particles by action of a mechanical impact force (mechanochemical method), thereby preparing carrier particles.

D-2. Preparation of Two-Component Developer (1) Preparation of Two-Component Developer 1

The toner particles 1 and the carrier particles prepared as described above were mixed such that the toner particle concentration was 6.5% by mass to obtain a two-component developer 1. Mixing was performed for 30 minutes using a V-type mixer.

(2) Preparation of Two-Component Developers 2 to 26

Two-component developers 2 to 23 were prepared in a similar manner to the two-component developer 1 except that the toner particles 1 were changed to the toner particles 2 to 26.

E. Evaluation

For each of the above-described two-component developers (toners), the toner scattering amount was evaluated as follows. Results thereof are indicated in Table 1.

[Evaluation of Toner Scattering Amount]

In addition, the scattering amount was measured three times, that is, after a two-component developer was filled in a developing device and stirred for one minute (initial stage), after the developing device was mounted on a commercially available electrophotographic image forming apparatus bizhub C368 (manufactured by KONICA MINOLTA, INC.) and 50,000 sheets of lateral bands having a printing area ratio of 5% were printed under an environment of 23° C. and 50% RH (durable NN environment), and after 50,000 sheets of lateral bands having a printing area ratio of 5% were printed under an environment of 30° C. and 80% RH (durable HH environment), and evaluation was performed under the following conditions. Note that in the following evaluations, ⊙ and ○ were regarded to be acceptable.

⊙: Toner scattering amount is less than 20,000 pieces/L

○: Toner scattering amount is more than 20,000 pieces/L and 50,000 pieces/L or less.

×: Toner scattering amount is more than 50,000/L.

TABLE 1

| | | | Strontium titanate particles | | | | | | Scattering amount | | |
| --- | --- | --- | --- | --- | --- | --- | --- | --- | --- | --- | --- |
| | Toner No. | No. | Number average primary particle size (nm) | Lanthanum content ratio (% by mass) | Surface treatment agent | Carbon content (%) | Addition amount (% by mass) | Adhesion strength (%) | Initial stage | Durable NN environment | Durable HH environment |
| Example 1 | 1 | 1 | 20 | 10 | C4 | 3.0 | 0.5 | 67 | ⊙ | ⊙ | ⊙ |
| Example 2 | 2 | 1 | 20 | 10 | C4 | 3.0 | 1.0 | 58 | ⊙ | ⊙ | ⊙ |
| Example 3 | 3 | 1 | 20 | 10 | C4 | 3.0 | 0.3 | 61 | ⊙ | ⊙ | ⊙ |
| Example 4 | 4 | 1 | 20 | 10 | C4 | 3.0 | 2.0 | 84 | ⊙ | ⊙ | ○ |
| Example 5 | 5 | 1 | 20 | 10 | C4 | 3.0 | 0.1 | 73 | ⊙ | ○ | ○ |
| Example 6 | 6 | 2 | 25 | 10 | C4 | 3.4 | 0.5 | 51 | ⊙ | ⊙ | ⊙ |
| Example 7 | 7 | 2 | 25 | 10 | C4 | 3.4 | 0.8 | 44 | ⊙ | ⊙ | ⊙ |
| Example 8 | 8 | 2 | 25 | 10 | C4 | 3.4 | 0.1 | 87 | ⊙ | ○ | ○ |
| Example 9 | 9 | 3 | 40 | 10 | C4 | 3.8 | 0.5 | 47 | ⊙ | ⊙ | ⊙ |
| Example 10 | 10 | 4 | 8 | 10 | C4 | 2.5 | 0.5 | 58 | ⊙ | ⊙ | ⊙ |
| Example 11 | 11 | 5 | 20 | 15 | C4 | 3.0 | 0.5 | 70 | ⊙ | ○ | ○ |
| Example 12 | 12 | 6 | 20 | 3 | C4 | 3.0 | 0.5 | 41 | ⊙ | ○ | ○ |
| Example 13 | 13 | 7 | 20 | 5 | C4 | 3.0 | 0.5 | 40 | ⊙ | ⊙ | ⊙ |
| Example 14 | 14 | 1 | 20 | 10 | C4 | 3.0 | 0.5 | 40 | ⊙ | ⊙ | ⊙ |
| Example 15 | 15 | 8 | 20 | 10 | C8 | 5.7 | 0.5 | 69 | ⊙ | ⊙ | ⊙ |
| Example 16 | 16 | 9 | 20 | 10 | C10 | 6.2 | 0.5 | 56 | ⊙ | ⊙ | ○ |
| Example 17 | 17 | 10 | 20 | 10 | HMDS | 1.4 | 0.5 | 69 | ⊙ | ○ | ○ |
| Example 18 | 18 | 11 | 20 | 10 | PDMS | 1.1 | 0.5 | 72 | ⊙ | ○ | ○ |
| Example 19 | 19 | 12 | 20 | 10 | Untreated | — | 0.5 | 47 | ○ | ○ | ○ |
| Example 20 | 20 | 13 | 20 | 10 | C4 | 7.9 | 0.5 | 80 | ⊙ | ⊙ | ⊙ |
| Example 21 | 21 | 14 | 20 | 10 | C5 | 1.1 | 0.5 | 76 | ⊙ | ⊙ | ⊙ |
| Example 22 | 22 | 15 | 45 | 10 | C4 | 3.5 | 0.5 | 40 | ○ | ○ | ○ |
| Example 23 | 23 | 1 | 20 | 10 | C4 | 3.0 | 2.5 | 72 | ○ | ○ | ○ |
| Comparative Example 1 | 24 | 16 | 20 | 0 | C4 | 3 | 0.5 | 71 | ○ | × | × |
| Comparative Example 2 | 25 | — | — | — | — | — | — | — | × | × | × |
| Reference Example | 26 | — | — | — | — | — | — | — | ⊙ | ⊙ | ○ |

The toner scattering amount was measured as follows using a particle counter (KR-12A manufactured by RION Corporation). In a developing device containing a two-component developer, a developing roller was set in a rotatable driving machine, and a suction port of the particle counter was set at a position 1 cm away from a front end of the developing roller. A particle size measurement range of the particle counter was set to 2 to 10 μm, and the developing roller was rotated at 270 rpm. For measurement with the particle counter, an operation of counting for 20 seconds and stopping for 10 seconds was repeated five times, and an average of the values measured five times was taken as the scattered amount.

As indicated in Table 1 above, a toner containing toner base particles and lanthanum-containing strontium titanate particles had a small toner scattering amount in any of the initial stage, the durable NN environment, and the durable HH environment (Examples 1 to 23). On the other hand, a toner containing toner base particles and lanthanum-free strontium titanate particles had a small scattering amount in the initial stage, but had a large scattering amount after printing (Comparative Example 1). It is presumed that it was difficult to make the charging characteristics of a toner surface sufficiently uniform.

Meanwhile, a toner containing no strontium titanate particles themselves had a large toner scattering amount even in the initial stage (Comparative Example 2).

In addition, a toner containing lanthanum-containing strontium titanate particles surface-treated with a silane coupling agent (Examples 1 to 18, 20, and 21) had a smaller scattering amount in the initial stage than a toner containing lanthanum-containing strontium titanate particles that have not been surface-treated (Comparative Example 19). However, a toner containing strontium titanate particles each having a relatively large particle size (Example 22) or a toner containing a relatively large amount of strontium titanate particles (Example 23) tended to have a large scattering amount.

Note that in Reference Example in which a toner contained no metal pigment, a scattering amount was hardly increased even when the toner contained no strontium titanate. That is, it can be said that the problem of the present application is a problem that occurs when a toner contains a metal pigment.

The electrostatic charge image developing toner according to an embodiment of the present invention can suppress occurrence of toner scattering even during continuous printing. Therefore, the electrostatic charge image developing toner is useful in various printing fields.

Although embodiments of the present invention have been described and illustrated in detail, the disclosed embodiments are made for purposes of illustration and example only and not limitation. The scope of the present invention should be interpreted by terms of the appended claims.

What is claimed is:

1. An electrostatic charge image developing toner comprising:
    toner base particles containing a binder resin and a metallic gloss pigment; and
    an external additive containing lanthanum-containing strontium titanate particles,
    wherein the lanthanum-containing strontium titanate particles are surface-treated with a coupling agent represented by the following general formula (1):

$$X\text{-}M(OR)_3 \tag{1}$$

wherein M represents titanium or silicon,
    X represents an alkyl group having 4 to 12 carbon atoms, and
    Rs each independently represent a methyl group or an ethyl group,
    the lanthanum-containing strontium titanate particles surface-treated with the coupling agent have a carbon content of 1.0 to 8.0% by mass,
    the lanthanum-containing strontium titanate particles have a number average primary particle size of 8 to 40 nm, and an amount of the lanthanum-containing strontium titanate particles is 0.05 to 2.0% by mass with respect to an amount of the toner base particles.

2. The electrostatic charge image developing toner according to claim 1, wherein
    an amount of lanthanum atoms in the lanthanum-containing strontium titanate particles is 3 to 12% by mass.

3. The electrostatic charge image developing toner according to claim 1, wherein
    an adhesion strength of the lanthanum-containing strontium titanate particles on a particle surface of the toner, represented by the following formula (A), is within a range of 45 to 85%:

adhesion strength of lanthanum-containing strontium titanate particles=(Sr atom abundance ratio of the electrostatic charge image developing toner after ultrasonic treatment/Sr atom abundance ratio of electrostatic charge image developing toner before ultrasonic treatment)×100    formula (A)

wherein the electrostatic charge image developing toner after ultrasonic treatment refers to the electrostatic charge image developing toner obtained by wetting 3 g of the electrostatic charge image developing toner with 40 g of a 0.2% by mass polyoxyethyl phenyl ether aqueous solution in a 100 mL plastic cup, applying ultrasonic energy to the solution with an ultrasonic homogenizer at a current value of 60 µA for three minutes, then filtering the solution using a filter having an opening of 1 µm, washing the filtered product using 60 mL of pure water, and drying the washed product, and the Sr atom abundance ratio in formula (A) is a value calculated based on the following formula (B) from a peak area of each atom obtained by measuring a surface of the electrostatic charge image developing toner by X-ray electron spectroscopy:

Sr atom abundance ratio=(peak area$_{Sr}$/(peak area$_c$+ peak area$_o$+peak area$_{Si}$+peak area$_{Ti}$+peak area$_{Sr}$))×100 atom %    formula (B).

4. The electrostatic charge image developing toner according to claim 1, wherein the toner is configured to provide an image having a metallic gloss.

5. The electrostatic charge image developing toner according to claim 1, wherein the metallic gloss pigment is selected from the group consisting of aluminum powder, brass powder, bronze powder, nickel powder, stainless steel powder, zinc powder, copper powder, silver powder, gold powder, platinum powder, and flaky glass powder deposited with metal.

* * * * *